United States Patent [19]
Smith

[11] 4,370,117
[45] Jan. 25, 1983

[54] FOAMING APPARATUS

[75] Inventor: Stuart B. Smith, Conyers, Ga.

[73] Assignee: Thermoset AG, Lucerne, Switzerland

[21] Appl. No.: 184,617

[22] Filed: Sep. 5, 1980

[51] Int. Cl.³ .............................................. B29B 7/14
[52] U.S. Cl. .................................... 425/224; 156/78; 156/324; 156/244.11; 156/501; 156/543; 264/41; 264/46.2; 264/DIG. 2; 425/115; 425/817 C
[58] Field of Search ...................... 156/78, 77, 79, 543, 156/244.11, 500–501, 324; 264/45.8, 46.2, 46.3, 54, 41, DIG. 2; 425/4 C, 115, 817 C, 371, 224

[56] References Cited
U.S. PATENT DOCUMENTS

| | | | |
|---|---|---|---|
| 2,841,205 | 7/1958 | Bird | 156/79 X |
| 3,248,464 | 4/1966 | Telkes | 156/77 X |
| 3,598,769 | 8/1971 | Hanton | 425/371 X |
| 3,786,122 | 1/1974 | Berg | 264/46.2 |
| 4,187,066 | 2/1980 | Hobson | 264/DIG. 2 |

*Primary Examiner*—David A. Simmons
*Attorney, Agent, or Firm*—Cushman, Darby & Cushman

[57] ABSTRACT

A foaming apparatus for manufacturing insulation material includes a mixing chamber, a pump for withdrawing the composition from the mixing chamber and supplying it to the apex of a hollow conical expansion chamber where the apex is located vertically beneath the base of the cone, a cover for the base of the cone including an outlet in the form of a nozzle which imparts a desired shape to the foamed composition.

5 Claims, 7 Drawing Figures

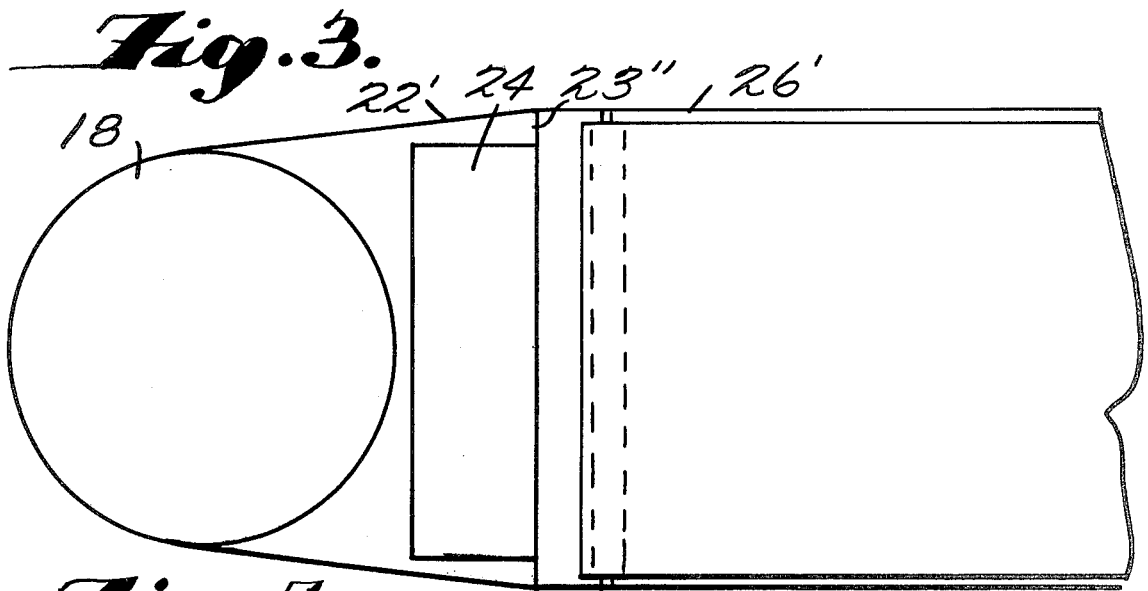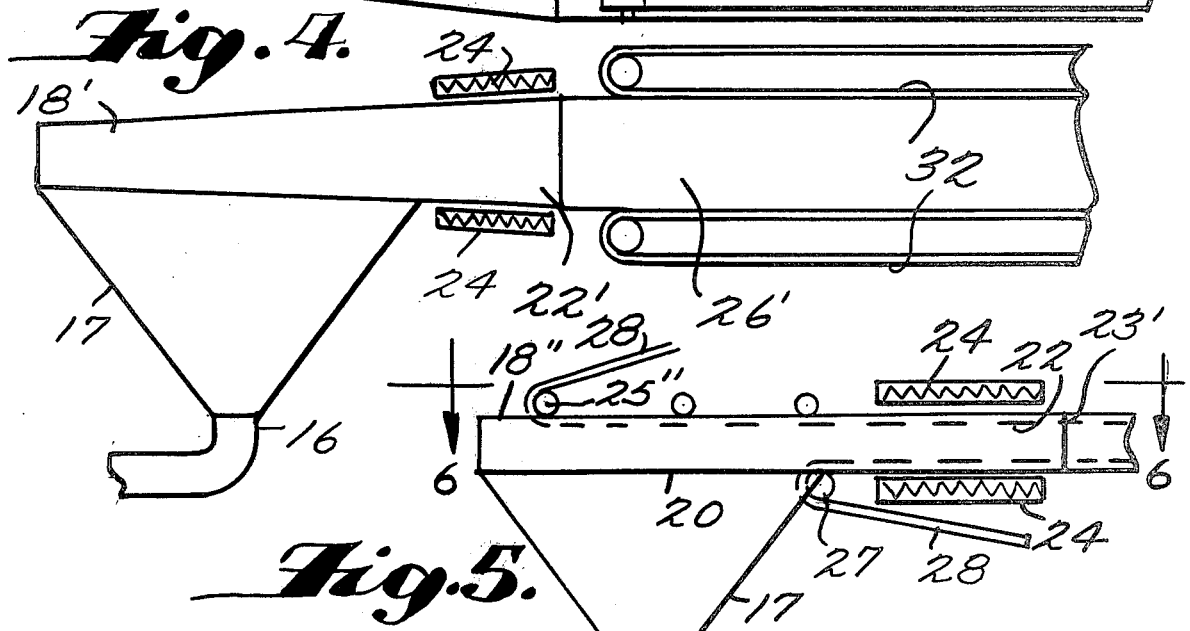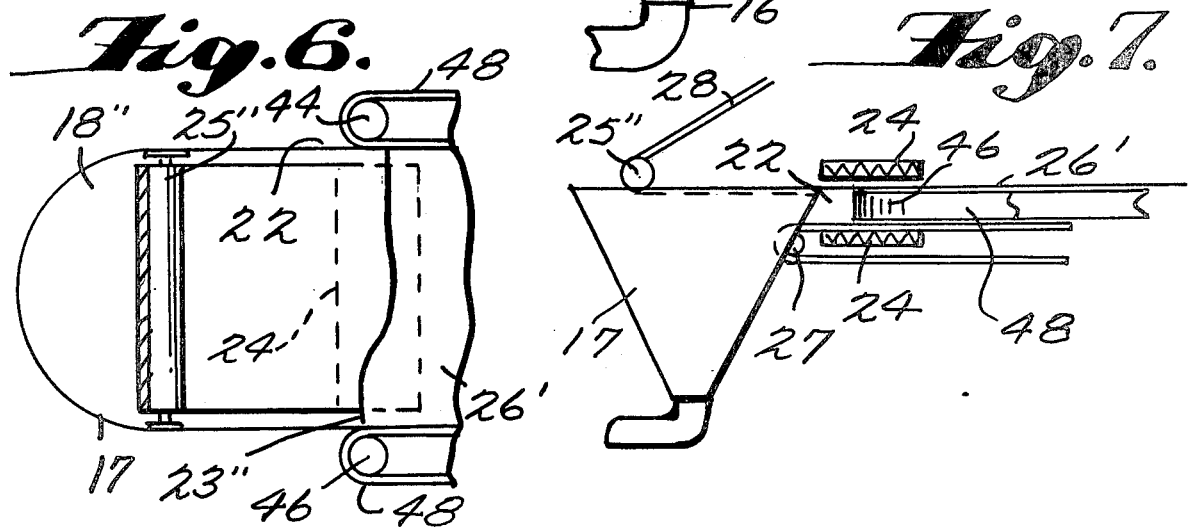

FOAMING APPARATUS

BACKGROUND AND BRIEF DESCRIPTION OF THE INVENTION

The present invention relates to an apparatus for manufacturing insulation material from a phenol-formaldehyde resin such as is disclosed in co-pending U.S. application Ser. No. 167,763, filed July 14, 1980, and assigned to the same assignee as the present application.

Insulation board has previously been made from a variety of compositions such as polyurethane, polystyrene and the like. Such compositions, while providing a useful insulation, have several inherent drawbacks in terms of their applications and methods of manufacture. For example, polyurethane has been criticized as a hazard due to the toxic fumes that result when the material is ignited. Also, in the formation of polyurethane and polystyrene foam boards, either a discontinuous process must be employed to obtain a suitable, stable product or the speed of the manufacturing process must be unacceptably slow in order to control the foaming of the composition to assure production of a product that will have sufficient insulating properties. As noted in the above-identified U.S. application, Ser. No. 167,763, the use of a phenol-formaldehyde resin as a foaming composition avoids a number of the problems of the prior art foaming compositions. However, one of the drawbacks in the prior art that has prevented the widespread use of a phenol-formaldehyde resin is the lack of structural integrity in the resulting product. While to a large extent, these problems have been overcome by use of the composition of the above-identified Ser. No. 167,763, it has been found that a superior product can be obtained, that is, one having adequate flexibility without crumbling yet improved structural integrity and strength by use of the improved foaming apparatus of the present invention.

In summary, it has been found that where the phenol-formaldehyde resin composition of co-pending application, Ser. No. 167,763, is allowed to freely expand in a large volume chamber to fill the chamber and then continue to foam in a steady state condition under back pressure developed by the process, an insulation board is obtained that is somewhat flexible as compared to prior phenolic foams but which is significantly less friable and thus usable in a substantially greater number of insulation applications than has previously been the case. However, to further broaden the number of structural applications to which the phenol-formaldehyde compositions of the previously identified application may be put, it is desirable to obtain a stronger product.

To this end, the apparatus of the present invention was developed and which comprises as the foaming chamber an inverted conical chamber. The foamable composition is introduced into the apex of the inverted cone chamber and allowed to foam. As the foaming proceeds, the composition is moved vertically up the cone towards the base of the cone, which is vertically above the apex, and from thence to a forming apparatus which in one embodiment is a tunnel or nozzle which imparts the final desired shape to the foaming composition.

With the foregoing arrangement, the molecules of the composition show a greater degree of bi-axial orientation which is believed to impart substantially greater structural integrity and strength to the resulting product than has previously been the case where foaming has occurred substantially along a single axis while expansion along axes transverse to the single axis has been inhibited.

Further advantages of the apparatus of the present invention will become apparent as consideration is given to the following detailed description taken in conjunction with the accompanying drawings, in which:

BRIEF DESCRIPTION OF THE DRAWINGS

FIG. 3 is a top plan view of another embodiment of the present invention;

FIG. 4 is a side view in elevation of the embodiment of FIG. 3;

FIG. 5 is a side view in elevation of another embodiment of the present invention;

FIG. 6 is a top plan view with parts broken away showing a further modification of the embodiment of FIG. 5; and FIG. 7 is a side view in elevation of the embodiment of FIG. 6.

DETAILED DESCRIPTION OF THE INVENTION

The apparatus of the present invention is particularly useful with the foaming composition such as disclosed in U.S. application, Ser. No. 167,763, filed July 14, 1980 and assigned to the same assignee as the present application, the disclosure of which is incorporated herein by reference.

Figure 1:
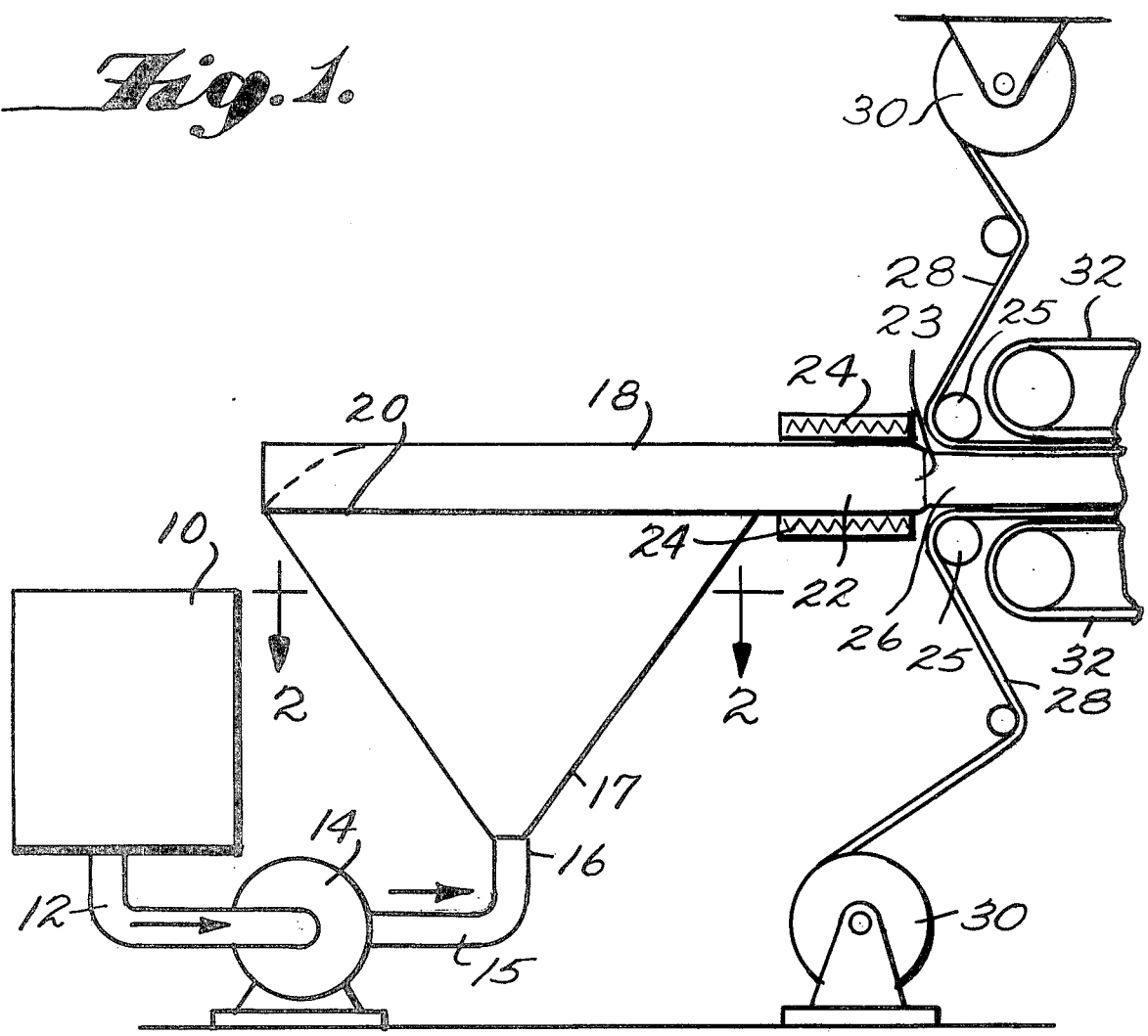
FIG. 1 is a schematic illustration of the apparatus of the present invention in side elevation.

Referring now to the drawings, there is shown in FIG. 1 a mixing chamber 10 into which is deposited a foamable composition such as disclosed in the above-identified application, Ser. No. 167,763. From the mixing chamber 10 through conduit 12, the composition is rapidly pumped by a variable speed pump 14 to a feed conduit 15 which is connected to the open-ended apex 16 of an expansion chamber means in the form of a hollow cone 17. The conical chamber 17 is inverted so that the apex 16 is located vertically below the base 20 of the cone 17. The interior walls of the chamber 17 are smooth and the chamber may be made from a material such as fiberglass. The base 20 of the chamber 17 is closed in an airtight manner by a cover 18 which has on one side thereof a tunnel or nozzle-like outlet 22. As disclosed in application, Ser. No. 167,763, the nozzle may take any desired shape so as to impart a desired form to the composition as it emerges from the end 23 of the nozzle 22. Preferably, to facilitate the reaction and drive off any free phenol and formaldehyde, the nozzle 22 may be surrounded by heating elements 24 which may be steam or electrically heated. As the formed composition emerges from the nozzle 23, it is supported on rollers 25 about which facing material such as aluminum foil 28 is supplied from rolls 30. Generally, the surface of the insulation board 26 is sufficiently tacky to form a firm bond with the sheet material 28. Conveying means such as belts 32 are provided to carry the product, now covered on its top and bottom surfaces with the foil 28 to further handling equipment such as cutting devices and stackers.

Figure 2:
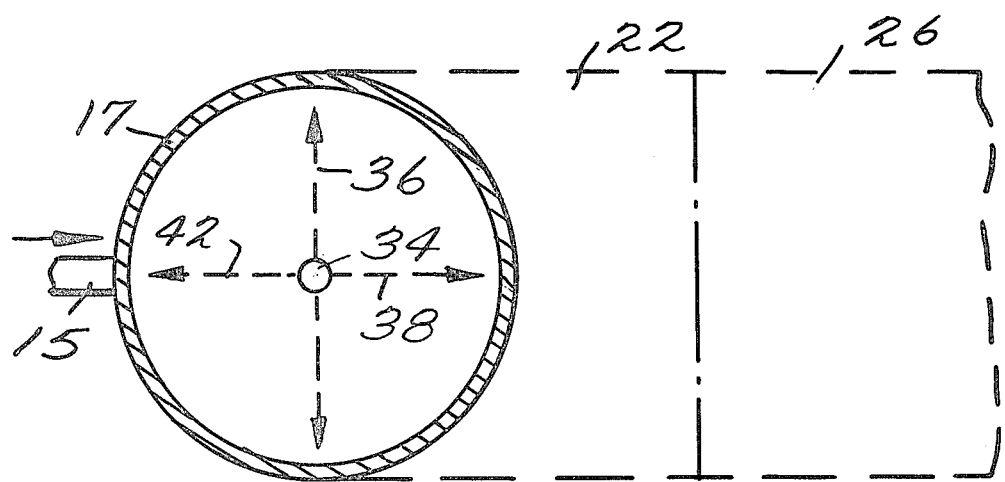
FIG. 2 is a sectional view along lines 2—2 of FIG. 1.

Referring now to FIG. 2, there is shown a view of the conical chamber 17 looking down its central axis 34. As described in the aforementioned U.S. application, the density of the product can be controlled by correlating the take-away speed of the rollers 25 and conveyors 32 with the input speed of the variable speed pump 14. Thus, once steady state running conditions have been achieved, foaming and expansion of the composition in conical chamber 17 will progress radially as indicated by the arrows 36, 38, 40 and 42 as well as vertically along axis 34 as an incremental cross-section of the composition moves vertically from the inverted apex 16 towards the base 20. Thus, expansion takes place both radially, that is, transverse to the axis 34 as well as vertically, that is, parallel to the axis 34 resulting in bi-axial orientation of the molecules of the composition. As a result, both a stronger yet more flexible resulting product and smoother running conditions are achieved as compared to an arrangement utilizing a chamber which inhibits expansion along axes transverse to the vertical flow of the composition.

Referring now to FIGS. 3 and 4, there is shown another embodiment of the present invention where the cover 18' and nozzle end 22' are flared outwardly so as to permit further biaxial expansion of the foaming composition so that the resulting product 26' will have greater length and width dimensions than that obtainable with the apparatus of FIG. 1. The heaters 24 which are preferably steam heated may completely surround the nozzle 22' if desired. In FIGS. 3 and 4, the rollers 25 which carry the facing material such as foil 28 are omitted for clarity. The other auxiliary elements of the invention are the same as illustrated in FIG. 1.

Turning now to FIG. 5, there is shown a further modification of the apparatus of the present invention wherein the cover 18" extends over only a small portion of the conical chamber 17 and, in its place, the roller 25" for the coil facing material is located over the conical chamber 17 and the roller 27 for the opposite face of the foaming composition is located adjacent to the upper end 20 of the conical chamber 17 so that the foil 28 defines both the lower and the upper wall of the nozzle 22. As in the embodiment of FIG. 1, the facing material 28 is supplied from the respective upper and lower rollers 30 to the respective rollers 25" and 27. However, since the facing material 28 that is led around roller 25" extends substantially across the top of the base 20 of the chamber 17, substantially greater control of the density of the resulting product emerging from the end 23" of the nozzle is achieved since the take-away speed of the foaming composition can be directly controlled by the transport speed of the facing material 28 which control can be effected by suitable gearing and drive motors attached to the rollers 25' and 27 alone or in conjunction with the speed of conveyors 32 downstream of the end 23" of nozzle 22. Since the conveyor belts 32 directly engage the outer surfaces of the sheets 28, by controlling the speed of the conveyor belts 32, the take-away rate for the foaming composition from the conical chamber 17 can be directly controlled. Thus, the faster the take away, the higher will be the density of the resulting product since foaming essentially ceases as the foaming composition passes between heaters 24 to the outlet 23'. Conversely, by slowing down the take-away speed of the conveyors 32 and thereby the speed of the facing material 28, a higher density product will be obtained since foaming will be permitted to occur for a longer unit of time.

Turning now to FIGS. 6 and 7, a further embodiment of the present invention is illustrated wherein rollers 44 and 46 are placed so that their axes of rotation extend perpendicular to the direction of travel of the foaming composition 26'. The rollers 44 and 46 are placed on either side of the foaming composition 26' as it emerges from the end 23" of the nozzle 22 whereby facing material 48 may be supplied to the side edges of the foaming composition 26'. With this arrangement, a completely covered product is obtained.

It will be apparent that with the arrangement of FIGS. 5-7, the flared nozzle 22' may also be employed but modified to take into account the location of the roller 25' over the base 20 of the chamber 17.

Having described the invention, it will be apparent that various modifications may be made therein without departing from the spirit and scope of the present invention as defined in the appended claims.

What is claimed is:

1. An apparatus for producing insulation material from a foamable composition wherein supply means are used to supply the composition to an expansion chamber and conveying means are used to convey the foam product from the expansion chamber, the improvement comprising said expansion chamber being in the form of a hollow cone having an apex at one end and a base at the opposite end thereof, wall means extending from said base to said apex, inlet means at said apex and outlet means adjacent said base, said outlet means including a nozzle attached to a cover with said cover closing said base of said expansion chamber, said nozzle and cover having walls that flare outwardly from one side of said expansion chamber towards the end of said nozzle located adjacent the opposite side of said expansion chamber.

2. The apparatus as claimed in claim 1 wherein said expansion chamber is made from fiberglass material.

3. The apparatus as claimed in claim 2 wherein said nozzle is provided about its exterior with heating means.

4. The apparatus as claimed in claim 1 wherein said supply means is a variable speed pump and a conduit connected to said pump and to said inlet means of said expansion chamber.

5. The apparatus as claimed in claim 1 wherein said conveying means comprise a plurality of belts mounted on rollers located adjacent to said outlet means.

* * * * *